United States Patent
Tew

(10) Patent No.: US 6,466,358 B2
(45) Date of Patent: Oct. 15, 2002

(54) ANALOG PULSE WIDTH MODULATION CELL FOR DIGITAL MICROMECHANICAL DEVICE

(75) Inventor: Claude E. Tew, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/750,828

(22) Filed: Dec. 28, 2000

(65) Prior Publication Data

US 2002/0012159 A1 Jan. 31, 2002

Related U.S. Application Data

(60) Provisional application No. 60/173,941, filed on Dec. 30, 1999.

(51) Int. Cl.[7] .............................................. G02B 26/00
(52) U.S. Cl. ...................... 359/292; 259/291; 259/295; 259/290
(58) Field of Search ................................ 359/290, 291, 359/292, 295, 245, 248, 224, 846, 871; 348/770, 771

(56) References Cited

U.S. PATENT DOCUMENTS

| 4,615,595 | A | | 10/1986 | Hornbeck |
| 5,061,049 | A | | 10/1991 | Hornbeck |
| 5,535,047 | A | * | 7/1996 | Hornbeck ................... 359/295 |
| 5,583,688 | A | | 12/1996 | Hornbeck |
| 5,670,976 | A | * | 9/1997 | Chiu et al. .................... 345/84 |
| 6,147,790 | A | | 11/2000 | Meier et al. |

* cited by examiner

Primary Examiner—Georgia Epps
Assistant Examiner—Tuyen Tra
(74) Attorney, Agent, or Firm—Charles A. Brill; Wade James Brady, III; Frederick J. Telecky, Jr.

(57) ABSTRACT

A frame-addressed bistable micromirror array and method of operation. An analog input signal representing the desired intensity of an image pixel is applied to input 302. An address signal synchronized to the analog input signal is applied to input 304 of a given micromirror cell to store the pixel intensity information on input capacitor 306. After intensity information for each pixel in the video frame or field, or a portion of the frame of field, is stored on the input capacitor 306 of the appropriate micromirror cell, a frame signal is applied to input 308 to enable the transfer of charge between capacitors 306 and 310 and to turn on transistor 314 allowing a voltage applied to input 316 to charge capacitor 318. The pre-charge voltage is chosen to ensure the biased micromirrors are fully deflected to a first state. A ramp voltage is applied to input 322. A ramp voltage is applied to input 322. When the difference between the voltage across capacitor 310, which is applied to the gate of transistor 324, and the ramp voltage, which is applied to the drain of transistor 324, exceeds the threshold voltage required to turn on transistor 324, transistor 324 is turned on, and the voltage across capacitor 318 follows the ramp voltage applied to 322. The range of the ramp voltage is chosen so that, when any ramp voltage in the range is applied to the deflectable element of the micromirror, the deflectable element will assume the second state.

7 Claims, 3 Drawing Sheets

ANALOG PULSE WIDTH MODULATION CELL FOR DIGITAL MICROMECHANICAL DEVICE

CROSS-REFERENCE TO RELATED APPLICATIONS

This application claims priority under 35 USC §119(e)(1) of provisional application No. 60/173,941 filed Dec. 30, 1999.

The following patents and/or commonly assigned patent applications are hereby incorporated herein by reference:

| Pat. No. | Filing Date | Issue Date | Title |
|---|---|---|---|
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 4,615,595 | Oct. 10, 1984 | Oct. 7, 1986 | Frame Addressed Spatial Light Modulator |
| 6,147,790 | May 13, 1999 | Nov. 14, 2000 | Spring-Ring Micromechanical Device |
| 60/173,859 | Dec. 30, 1999 | | Color Wheel For A Falling Raster Scan |

FIELD OF THE INVENTION

This invention relates to the field of micromechanical devices, more particularly to spatial light modulator designs capable of performing analog pulse width modulation of image data using bistable micromirror devices.

BACKGROUND OF THE INVENTION

A major advance in the design of spatial light modulators was the development of micromirror devices capable of operating in a bistable, or digital, mode. Digital operation of a micromirror device enables the use of digital pulse width modulation (PWM) and eliminates many of the manufacturing process dependent pixel-to-pixel variations that plagued analog-mode beam steering micromirror designs. Digital PWM operation, in which an analog voltage level representing the intensity of a pixel is digitized and each bit of the resulting word is displayed for a period proportional to its binary weight, comes at a tremendous cost in terms of data transfer rates and the hardware necessary to sample and process the image data.

PWM-based micromirror displays can create many image artifacts. These artifacts include motion and other artifacts caused by the digital nature of the display, as and artifacts caused by the differences between micromirror and CRT transfer functions. Motion artifacts are ameliorated by complicated processing of the digital data to strategically split many of the data bit periods into multiple bit periods which are then spread throughout the frame display period. Transfer function artifacts are reduced by removing the gamma compensation from the input signal.

The image data digitization and processing results in a very large amount of image data that must be loaded into the micromirror during a relatively short frame period. In addition to the high data rate required, the data must be reformatted from a pixel-serial, bit-parallel format to a pixel-parallel, bit-serial format. This "corner turning" function provides equal weight image data bits for many pixels for each display period.

What is needed is a method and system of operating a digital micromirror device that does not require the image processing hardware and memory necessary to perform digital PWM.

SUMMARY OF THE INVENTION

Objects and advantages will be obvious, and will in part appear hereinafter and will be accomplished by the present invention that provides a method and system for analog pulse width modulation of a digital micromirror device. One embodiment of the claimed invention provides a method of operating a bistable micromirror array. The method comprises the step of providing a data signal to address circuitry in each cell of the bistable array, the data signal representative of the desired intensity of a pixel formed by the micromirror cell, which is a function of the position of the deflectable mirror element integrated over a field or frame period. A ramp signal is provided to the address circuitry in each said cell and a mirror address signal dependent on the difference between said data signal and said ramp signal is generated. A bias signal is also provided to the addressing circuitry. The bias signal and mirror address signal cooperative operate to deflect the mirror element to a first position when the address signal is equal to a pre-charge value, and a second position when the address signal is equal to the ramp voltage.

The disclosed addressing circuitry and method provides a method and system for controlling a micromirror display system that requires a minimal amount of control hardware. The method also eliminates the artifacts created by various forms of digital pulse width modulation. Thus, the method and system enable a low-cost display system to provide an acceptable image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new modulation technique and micromirror design has been developed that enables low-cost display systems by operating a digital micromirror array using analog pulse width modulation. The new micromirror design and method of operation do not create many of the image artifacts created by digital PWM and therefore avoid the need for the processing hardware used by digital PWM display systems to ameliorate the artifacts. The disclosed micromirror design provides a method of performing the degamma operation that requires very little additional circuitry.

Although the following description will describe the disclosed invention in terms describing its application to the operation of a digital micromirror device, it should be understood that the invention is equally applicable in any situation in which it is desirable to perform analog pulse width modulation using a bistable micromechanical device. For example, the invention may eliminate many of the same complexity problems when applied to the control of bistable micromechanical flow regulators.

Figure 2:
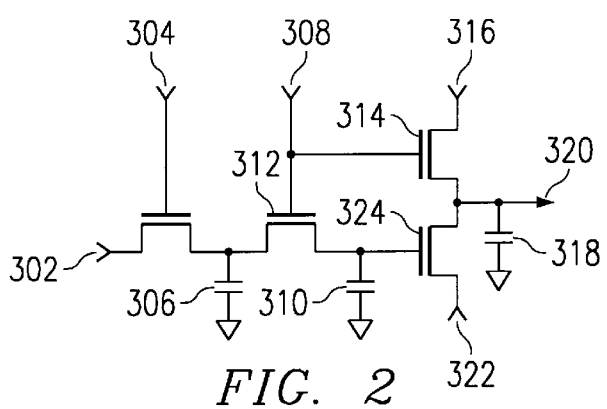
FIG. 2 is a schematic view of a portion of the addressing circuit for one micromirror cell in a micromirror array.

A typical hidden-hinge DMD is an orthogonal array of DMD cells. This array often includes more than a thousand DMD rows and columns of DMDs. FIG. 2 is an exploded view of the superstructure of one DMD cell.

A DMD is fabricated on a semiconductor, typically silicon, substrate 104. Electrical addressing circuitry is fabricated in or on the surface of the semiconductor substrate 104 using standard integrated circuit process flows. Voltage driver circuits to drive bias and reset signals to the mirror bias electrodes may be fabricated on the DMD substrate, or may be external to the DMD.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

Figure 1:
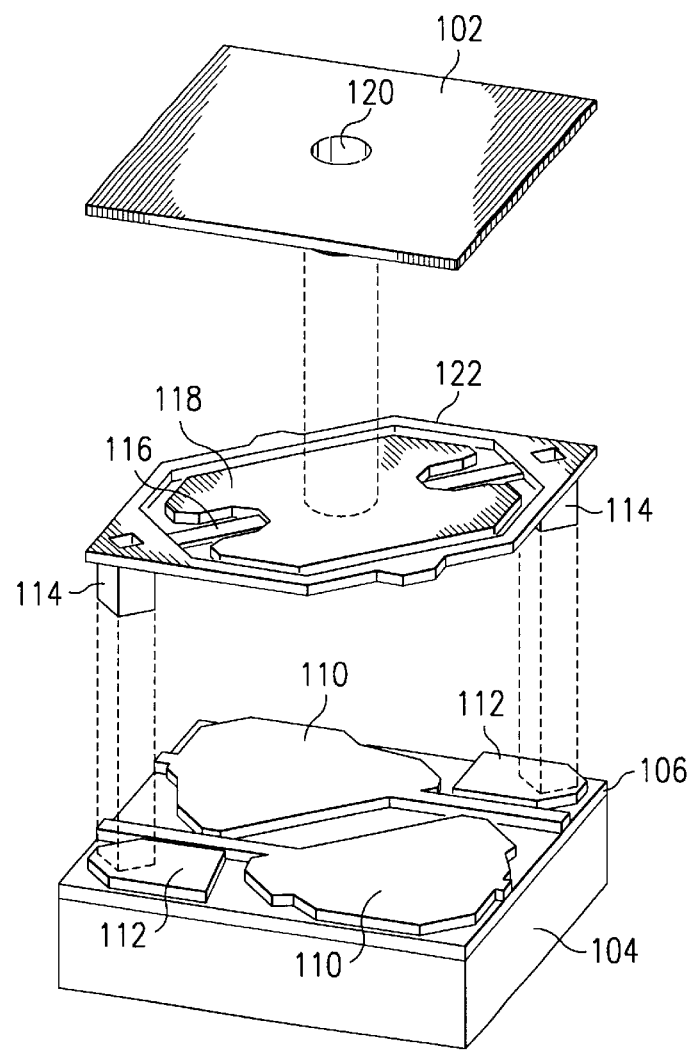
FIG. 1 is an exploded perspective view of an analog pulse width modulated micromirror cell.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form mirror bias electrodes 110. Vias in the protective oxide layer 106 allow pads 112 supporting the hinge support posts 114 to make electrical contact with the addressing circuitry formed in the substrate. The hinge support posts 114 support a torsion hinge 116, a hinge yoke 118, a mirror support post 120, and the mirror 102. The micromirror design shown in FIG. 1 is a spring-ring design in which the rotation of the hinge yoke and mirror is stopped by contact between the mirror and a ring-shaped spring member 122 surrounding the hinge yoke 118. Although the following description refers to a mirror-addressed spring-ring micromirror, the novel features described are easily transferable to other micromirror designs. Furthermore, with additional circuitry non-mirror addressed micromirrors may be used.

Mirror addressing refers to the fact that a signal representing the image data is applied to the mirror 102 and hinge yoke 118, and differential bias voltages are applied to the underlying bias electrodes 110. Depending on the mirror bias voltage applied to the hinge yoke, the hinge yoke and mirror with rotate toward one or the other of the two bias electrodes I 10. Mirror addressed arrays provide image data to each mirror and apply the same two bias voltages to the two bias electrodes in each cell. Non-mirror addressed micromirrors use a single common bias voltage applied to the mirror in each cell, and a differential image data signal to two address electrodes. If the difference between the bias voltages and the mirror address voltage is sufficiently large, the mirror will deflect until stopped by the spring ring. Varying the mirror address voltage controls which of the two bias electrodes the mirror deflects towards.

FIG. 2 is a schematic view of one embodiment of a portion of the addressing circuitry used to implement the disclosed invention. The addressing circuitry shown in FIG. 2 is associated with a single micromirror cell and generates a voltage used to control the position of the micromirror or other deflectable element. In FIG. 2, an analog input signal is applied to input 302. The analog input signal represents the desired intensity of an image pixel formed by the micromirror cell. The analog input signal typically is a raster-scanned signal which sequentially represents each pixel of the image being created. An address signal synchronized to the analog input signal is applied to input 304 of a given micromirror cell to store the pixel intensity information on input capacitor 306.

The circuitry shown in FIG. 2 can be modified to include various types of charge-coupled device (CCDS) or other methods of providing the appropriate portion of the analog input signal to micromirror cell. For example, one alternate circuit uses a CCD or other "bucketbrigade"-type device to shift in the analog input signal during the raster scan row period. During the horizontal retrace period, the charge from each cell of the CCD is transferred to a separate CCD that shifts the image data from one row to the next each horizontal retrace period. During a vertical retrace period, the charge from each cell of the CCD is transferred to capacitor 306 or, depending on the design of the display, directly into capacitor 310.

After intensity information for each pixel in the video frame or field, or a portion of the frame of field, is stored on the input capacitor 306 of the appropriate micromirror cell, a frame signal is applied to input 308 to enable the transfer of charge between capacitors 306 and 310. The relative sizes of capacitors 306 and 310 can be used to provide persistence as will be discussed below.

The frame signal applied to input 308 not only turns on transistor 312 to enable the transfer of charge between capacitors 306 and 310, it also turns on transistor 314. When transistor 314 is on, a voltage applied to input 316 charges capacitor 318. The voltage applied to input 316 is typically a supply voltage and is selected, along with bias voltages applied to the micromirror cell, to ensure full deflection of a mirror driven by output 320. Thus, each frame signal transfers image data to capacitor 310 and resets the charge on capacitor 318 to put the associated mirror in a first state.

The first state described above is assumed to be a state in which a micromirror does not direct light incident the micromirror to an image plane—resulting in a dark image pixel. Of course, the polarity and magnitude of the signals described can be altered to alter the operation of the micromechanical device without departing from the intent of the embodiments described herein. For example, the mirror could start in the second state, in which light incident the micromirror is directed to the image plane.

After the position of the deflectable micromirror element is initialized by the application of the supply voltage to capacitor 318, the frame signal applied to input 308 turns transistors 312 and 314 off and a ramp voltage is applied to input 322. As the ramp voltage applied to input 322 is reduced from an initial level, typically one volt, the difference between the voltage across capacitor 310, which is applied to the gate of transistor 324, and the ramp voltage, which is applied to the drain of transistor 324, will exceed the threshold voltage required to turn on transistor 324. When transistor 324 turns on, the voltage across capacitor 318 will follow the ramp voltage applied to 322. The range of the ramp voltage is chosen so that, when any ramp voltage in the range is applied to the deflectable element of the micromirror (mirror addressing), the deflectable element will assume the second state.

Alternate embodiments provide a more sophisticated comparator to compare the ramp voltage with the voltage across capacitor 310 and drive the mirror voltage dependent on the result of that comparison. This alternate embodiment, however, requires more circuitry, hence higher integration density is required.

While the ramp voltage will be shown and described as a linear ramp for the sake of simplicity, it should be understood that the ramp voltage is typically a non-linear ramp that is selected to remove the effects of gamma processing from the analog input signal. Gamma processing is applied to the analog input signal to compensate for the non-linear response of a cathode ray tube (CRT). When using a display device other than a CRT, the gamma processing results in an inaccurate intensity transfer function and degrades image quality. Therefore, when using the system described to display a video signal generated for a CRT, a non-linear ramp voltage should be used to alter the transfer function of the display.

Figure 3:
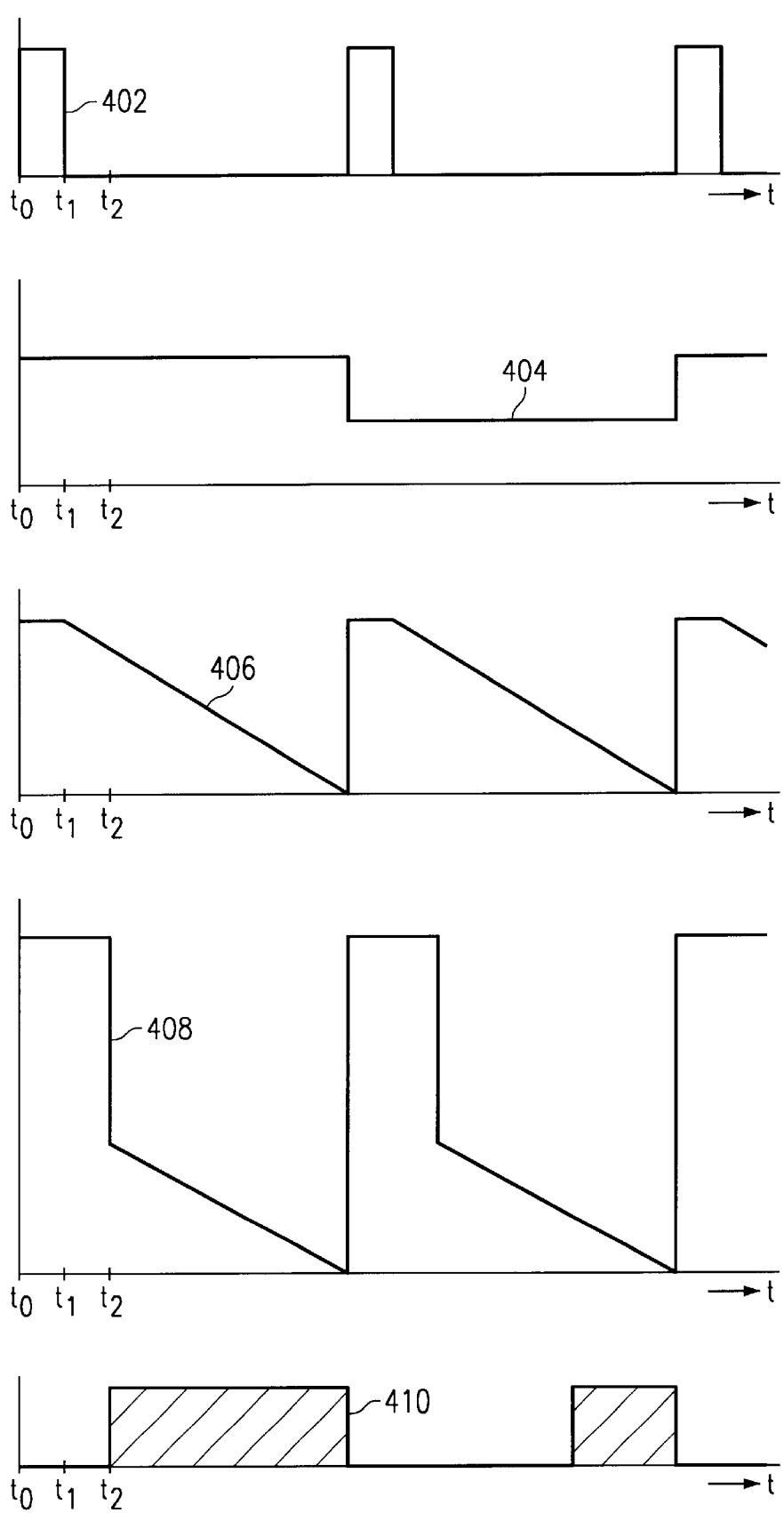
FIG. 3 is a plot of several voltage waveforms showing the operation of the analog pulse width modulation address circuitry of FIG. 3.

FIG. 3 is a plot of the voltage waveforms for a element during the operations described above. At $t_0$, the frame signal 402 on input 308 becomes active, storing a data voltage 404 across capacitor 310 and pre-charging capacitor 318. At $t_1$, the frame signal 402 stops, and the ramp voltage 406 beings to drop. The difference between the ramp voltage 406 and the data voltage 404 exceeds the turn-on threshold of transistor 324 at $t_2$, causing the mirror address voltage 408 to drop from the pre-charge voltage to the ramp voltage. When the mirror address voltage changes from the pre-charge voltage to the ramp voltage, the mirror can change states to turn the pixel on as shown by waveform 410. At the end of the voltage ramp, the frame signal 402 goes active storing a new data voltage 404 on capacitor 310 and starting the cycle over.

Although the mirrors ideally change states as soon as the mirror address voltage changes from the pre-charge voltage to the ramp voltage, in practice this is very difficult to ensure. Mirrors may not change states for two reasons. First, because the electrostatic attractive force between the mirror and the bias electrodes increases exponentially as the distance between them decrease, a very small voltage difference between the mirror and the bias electrode that it is rotated toward may generate a larger force than a larger voltage difference between the mirror and the opposite bias electrode. Second, attractive forces at the contact point between the mirror and the landing stop, commonly called stiction, can overpower the electrostatic force between the mirror and the opposite electrode.

Three operations help to ensure the mirror changes states shortly after the address voltage changes. First, the voltage used to control the mirror is chosen to provide the minimum force necessary to latch the mirror. Section, the voltage applied to the electrodes periodically is removed to allow the torsion hinge to begin rotating the mirror back to the neutral position. As the voltage is reapplied to the electrodes, the voltage differential between the mirror and each electrode properly positions the mirror. Increasing the number of times the voltage is removed ensures that improperly positioned mirrors—those mirrors that should have changed states before the voltage was removed—quickly are repositioned but also allows properly positioned mirrors to drift away from the landing stop. The voltage typically is removed 256 times each frame. Since the ability of the eye to detect mirror intensity differences decreases as the image intensity increases, the number and timing of the voltage removal periods can be selected to minimize the number of removal periods necessary.

The third operation is the periodic use of a reset voltage waveform to ensure that none of the mirrors are stuck to the landing electrodes. The use of reset voltage pulses is well known in the art. Any number of reset periods may be used, but typically eight reset period spread throughout the display period will reduce the effects of stuck mirrors to an acceptable level.

Although the description of the analog pulse width modulation method thus far as described the use of a single voltage ramp such that the entire micromirror array sees the same voltage ramp and address signals, the array easily can be divided into multiple segments that operate independently. This feature makes the array and modulation method taught herein ideally suited to handling either interlaced or progressive-scanned input signals. When receiving an interlaced signal, the data is loaded into alternate rows—for example the even rows. As the voltage ramp is applied to the even rows, new data is received and loaded into the odd rows. Then, as the odd rows receive the voltage ramp, a third field of data is loaded into the even rows.

While operating the array as two separate interleaved arrays produces a suitable image when receiving an interlaced signal, a second mode of operation better emulates the persistence provided by a CRT. Returning to FIG. 3, address input 304 is applied to alternate rows when receiving an interlaced signal. The frame signal is applied to transistor 312 in every row each field period. Turning transistor 312 on shares the charge stored on capacitor 306 with capacitor 310. Assuming no initial charge on capacitor 310, the pixel with have a greater charge on capacitor 310, and thus form a more intense image pixel, during the first field after the address signal is applied to input 304. The charge decays each subsequent field. The rate of decay depends on the relative sizes of capacitors 306 and 310. The step response is given by:

$$U(n)=V(1-a^n)$$

where $a=C_{310}/(C_{306}+C_{310})$. Thermal noise requires a minimum value for capacitor 310 of about 4fF. Because the device is very sensitive to even a small leakage current from the capacitors, the superstructure of the micromirror device may require a dedicated light shield layer to prevent photocarriers from being generated by light incident the micromirror device.

Figure 4:
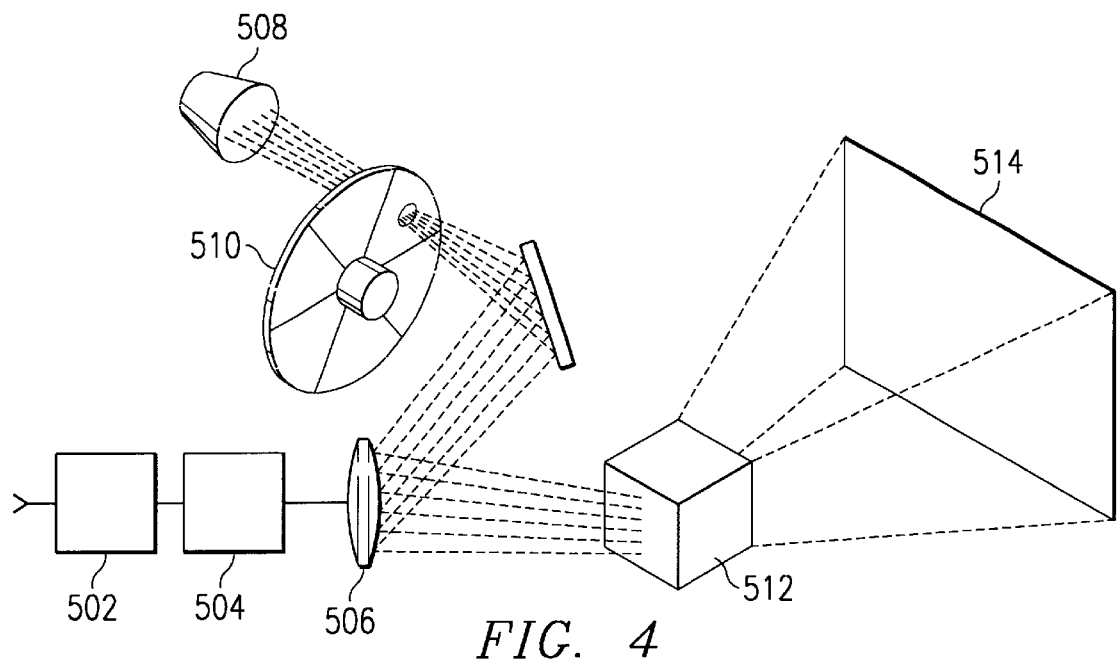
FIG. 4 is a schematic view of a sequential color display system using an array of analog pulse width modulated micromirrors.

FIG. 4 is a schematic view of a sequential color display system using the analog pulse width modulated micromirror device. In FIG. 4, a video signal is received and separated into monochromatic signals representing each of the three primary colors by signal separator 502. The three monochromatic signals are then stored by memory 504. The monochromatic signals are sequentially read from memory 504 each frame and loaded into the spatial light modulator 506 where they control the analog pulse width modulation operation described above.

Figure 2A:
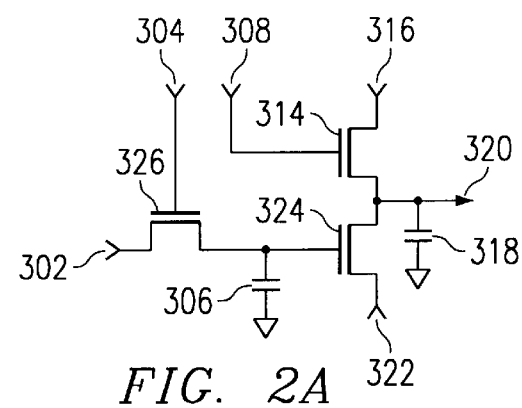

As one color frame ends, the next sequential frame begins. Thus, if the video is loaded in as a raster scan, the frame begins at a different time for each pixel. The beginning frame time for the top left pixel starts first and the bottom right pixel frame time start is delayed by the length of time for the data to scan through the array (approximately a frame time later). The ramp used for the top of the array has to start nearly a frame time before the start of the ramp for the bottom of the array. This condition is a problem, especially for the single DMD frame sequential system. Here the circuit shown in FIG. 2 has to be changed so that no residual charge from the previous frame is stored on capacitor 310. This can be done by removing transistor 312 and capacitor 310 and connecting the gate of transistor 324 to capacitor 306 and the drain of transistor 326 as shown in FIG. 2A.

The DMD is divided into horizontal strips of pixels having a ramp generator for each strip. If ten strips are used, this allows a 90% efficient data loading and frame efficiency.

As the new frame advances down the array, new video of the next color frame is displayed. Therefore, there will be at least two colors on the array. This requires a special color wheel that can image more than one color at a time on the DMD. Such a color wheel is taught by U.S. patent application No. 60/173,859, entitled "Color Wheel for a Falling Raster Scan" incorporated by reference herein.

Figure 5:
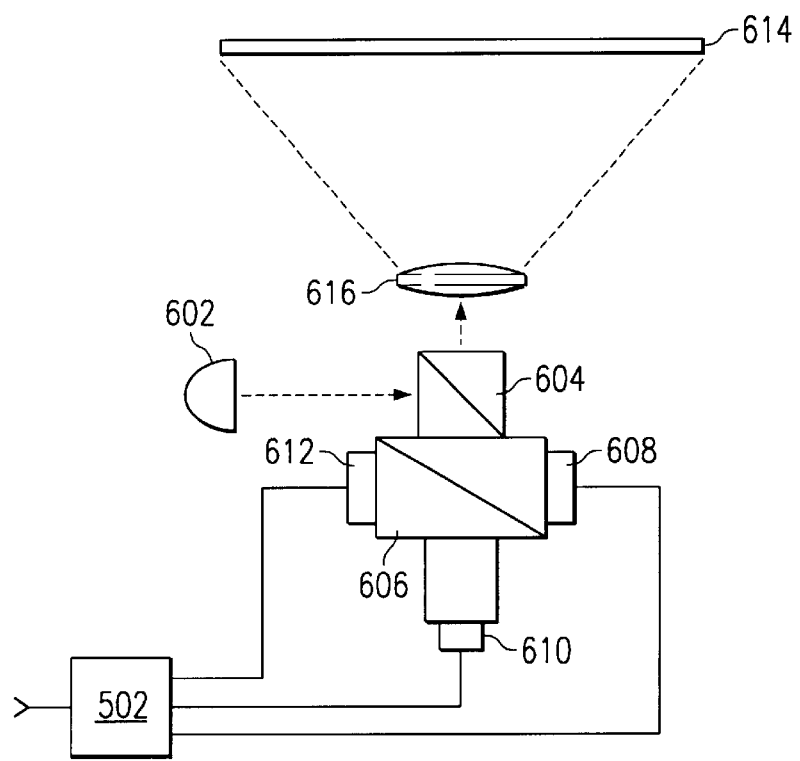
FIG. 5 is a schematic view of a three-color display system using three arrays of analog pulse width modulated micromirrors.

FIG. 5 is a schematic view of a three-modulator display system using the analog pulse width modulation methods described above. In FIG. 5, light from a source enters a TIR prism assembly 604 and is reflected into a color separation prism assembly 606. The dichroic filters on certain faces of the color separation prism assembly 606 separate the white light into three primary color light beams. Each primary color light beam is directed to one of the three spatial light modulators 608, 610, 612.

Signal separator 602 receives a video signal and separates the video signal into three separate primary color video signals. Each primary color video signal simultaneously controls one of the spatial light modulators to modulate the primary color light beam incident the spatial light modulator. The modulated primary color light beams are recombined by the color separation prism assembly and the recombined modulated beam of light passes through the TIR prism assembly and is focused onto the image plane 614 by projection lens 616.

Thus, although there has been disclosed to this point a particular embodiment for an analog pulse width modulated micromirror device and method of operation, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of operating a bistable micromirror array, said micromirror array comprised of at least one cell comprised of address circuitry and a deflectable mirror element, said method comprising the steps of:
   providing a data signal to said address circuitry in each said cell, said data signal representative of the desired integrated position of said deflectable mirror element;
   providing a ramp signal to said address circuitry in each said cell;
   generating a mirror address signal dependent on the difference between said data signal and said ramp signal, said mirror address signal having a first state when said difference exceeds a given threshold and a second state when said difference does not exceed said given threshold;
   providing a bias signal to said addressing circuitry, said bias signal operable to deflect said mirror element to a first position when said address signal is in said first state and a second position when said address signal is in said second state.

2. The method of claim 1, said step of providing a data signal to said address circuitry further comprising storing a charge representing an analog input voltage on a capacitor.

3. The method of claim 1, said step of providing a data signal to said address circuitry further comprising storing a charge representing an analog input voltage on a capacitor in each cell of said array once each video frame.

4. The method of claim 1, said step of providing a data signal to said address circuitry further comprising storing a charge representing an analog input voltage on a capacitor in each cell of alternate rows of said array once each video field.

5. The method of claim 1, said step of providing a data signal to said address circuitry further comprising the steps of:
   storing a charge representing an analog input voltage on first capacitor; and
   transferring a portion of said charge to a second capacitor upon activation of a frame signal.

6. The method of claim 5, said transferring step occurring once each video frame.

7. The method of claim 5, said transferring step occurring once each video field.

* * * * *